United States Patent
Ross

(10) Patent No.: US 7,407,632 B2
(45) Date of Patent: Aug. 5, 2008

(54) APPARATUS AND DELIVERY OF MEDICALLY PURE OXYGEN

(75) Inventor: Julian Ross, McKinney, TX (US)

(73) Assignee: OxySure Systems, Inc., Frisco, TX (US)

( * ) Notice: Subject to any disclaimer, the term of this patent is extended or adjusted under 35 U.S.C. 154(b) by 347 days.

(21) Appl. No.: 10/856,591

(22) Filed: May 28, 2004

(65) Prior Publication Data
US 2005/0265903 A1 Dec. 1, 2005

(51) Int. Cl.
A62B 7/08 (2006.01)
B01J 7/00 (2006.01)

(52) U.S. Cl. .................... 422/120; 422/122; 422/305; 128/202.26

(58) Field of Classification Search ............... 422/122, 422/120; 128/202.26
See application file for complete search history.

(56) References Cited

U.S. PATENT DOCUMENTS

| | | | |
|---|---|---|---|
| 3,702,305 A | 11/1972 | Thompson | |
| 3,725,156 A | 4/1973 | Thompson | |
| 3,793,810 A | 2/1974 | McPhee | |
| 3,986,838 A | 10/1976 | Reichert | |
| 4,246,229 A * | 1/1981 | McBride et al. | 422/122 |
| 4,278,637 A | 7/1981 | McBride | |
| 4,292,967 A | 10/1981 | Pasternack | |
| 4,310,502 A | 1/1982 | Wagner | |
| 4,508,700 A | 4/1985 | Hoshiko | |
| 4,548,730 A | 10/1985 | Koslow | |
| 4,683,130 A | 7/1987 | Ueno et al. | |
| 5,466,391 A | 11/1995 | Shinji | |
| 5,620,664 A | 4/1997 | Palmer | |
| 5,823,181 A | 10/1998 | Shih | |
| 6,123,069 A | 9/2000 | Davis | |
| 6,143,251 A | 11/2000 | Beller et al. | |
| 6,267,114 B1 | 7/2001 | Ueno | |
| 6,319,477 B1 | 11/2001 | Du Toit | |
| 6,651,658 B1 | 11/2003 | Hill et al. | |

FOREIGN PATENT DOCUMENTS

| | | |
|---|---|---|
| EP | 0349349 A2 | 1/1990 |
| WO | WO 86/02063 A1 | 1/1986 |
| WO | WO 90/11248 A1 | 10/1990 |

OTHER PUBLICATIONS

WWW.REDI-CHLOR.COM, Redi Chlor Water Purification Tablets, May 12, 2001, 3 pages, Cumming, IA 50061.
WWW.REDI-CHLOR.COM/EMERGENCY_OXYGEN.HTM, System O2 Emergency Oxygen Kit, Jun. 3, 2002, 2 pages, Cumming, IA 50061.
International Search Report, PCT/US05/24047, ISA/US, Mar. 13, 2007.
WWW.REDI-CHLOR.COM, System O2 Emergency Oxygen Kit, Dec. 2003, Cumming, IA 50061.

* cited by examiner

Primary Examiner—Elizabeth L McKane
Assistant Examiner—Kevin Joyner

(57) ABSTRACT

A lightweight, portable, reusable oxygen generator is provided. The oxygen generator comprises a reaction chamber, a humidifier, and a cap assembly. Once assembled, oxygen of medical purity can be generated in the reaction chamber via a chemical reaction. Then, the medically pure oxygen is separated from any of the aqueous reaction mixture and ported via a built-in humidifier to a CPR mask through a tube attached to the oxygen generator.

16 Claims, 11 Drawing Sheets

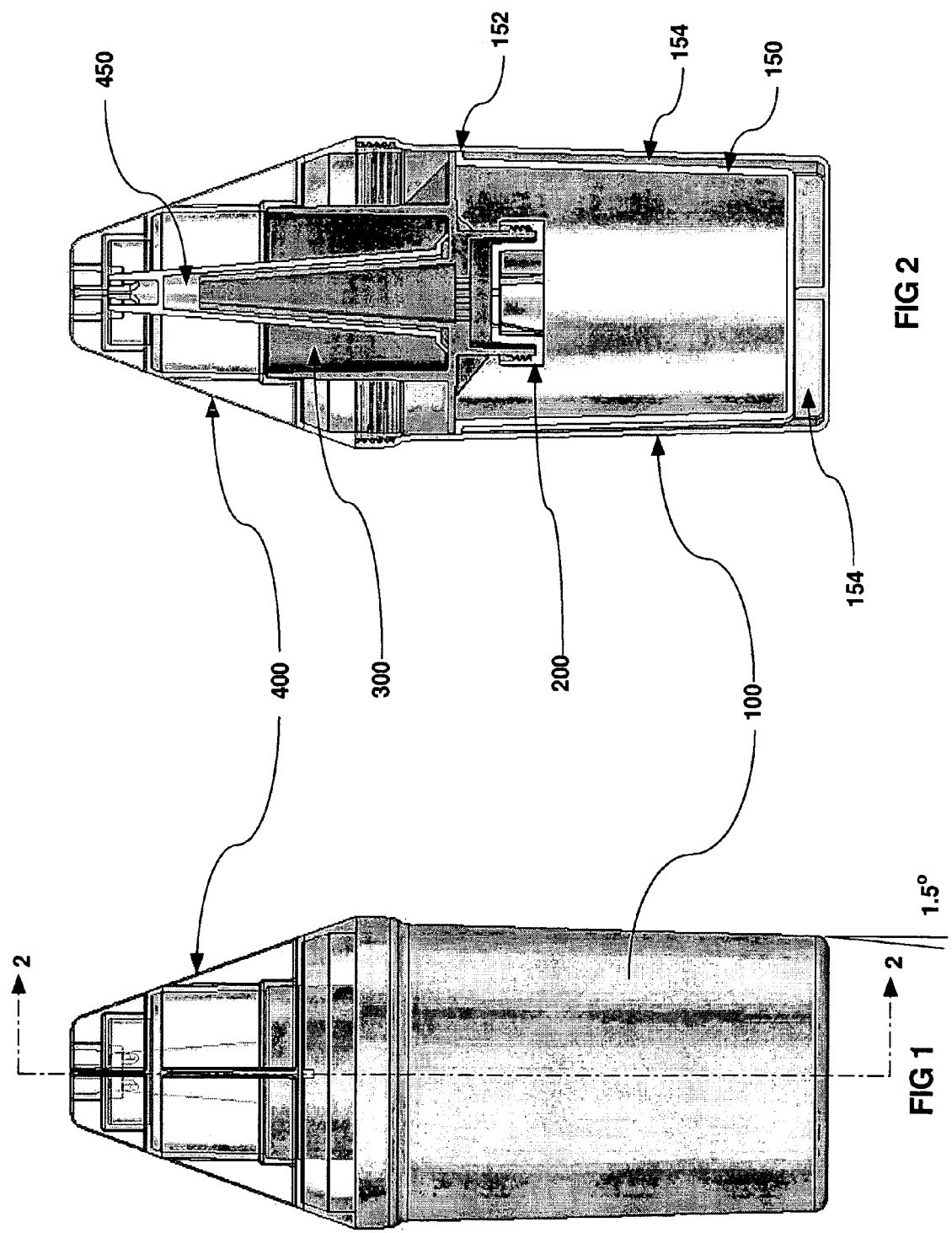

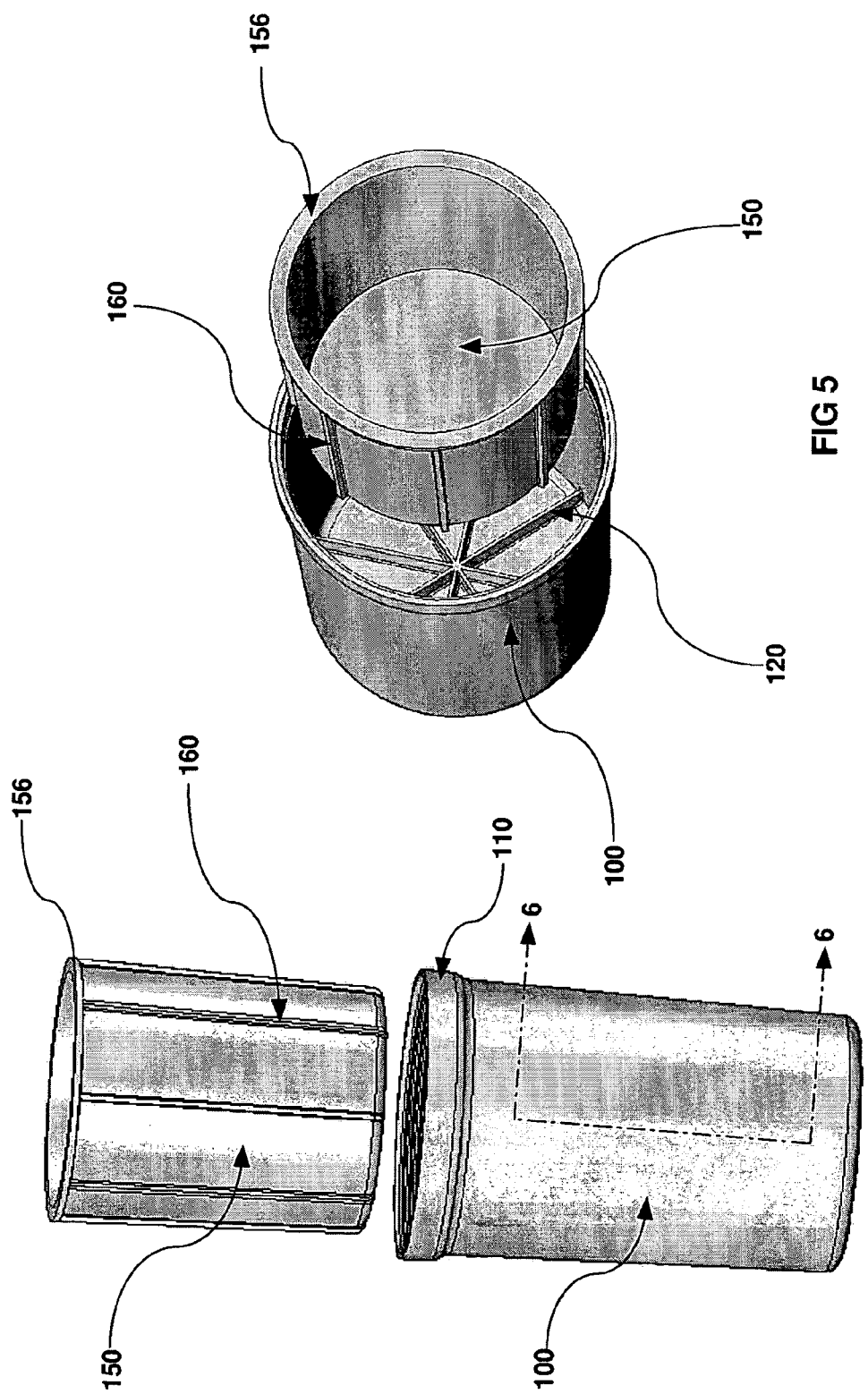

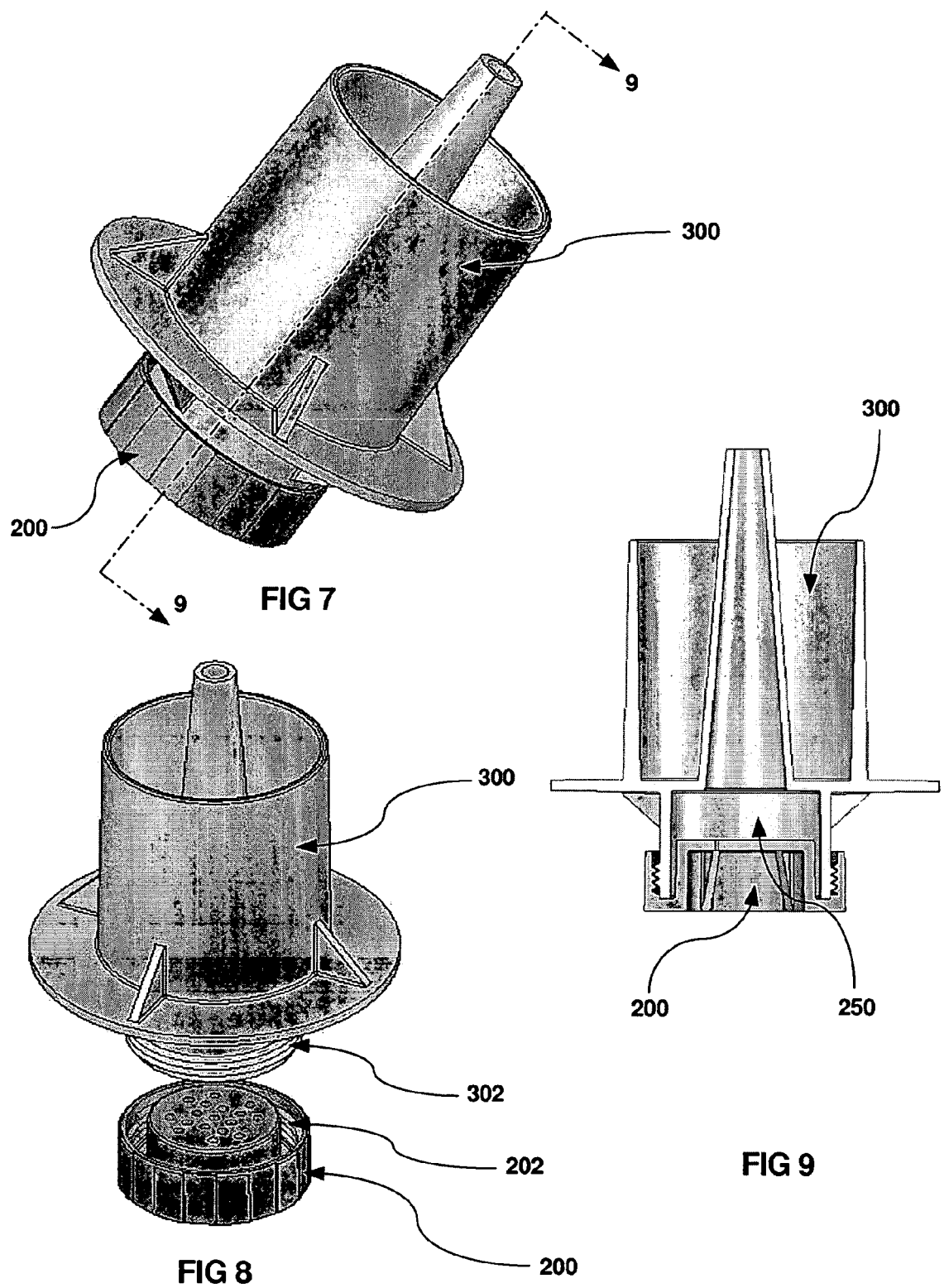

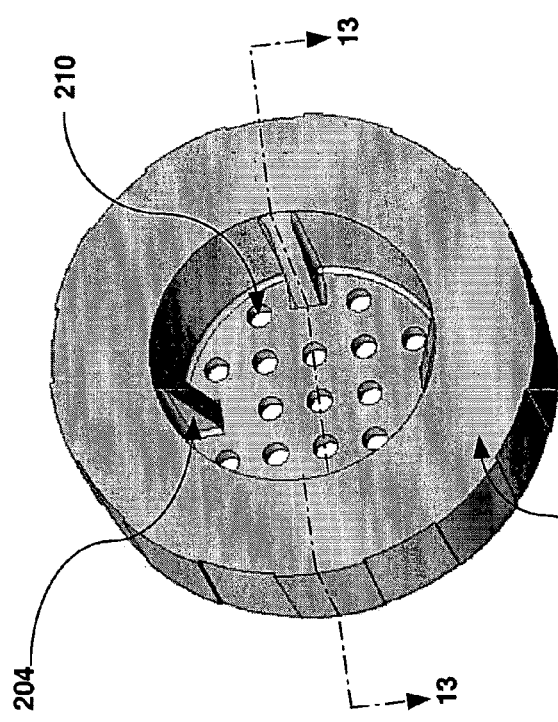
FIG 11
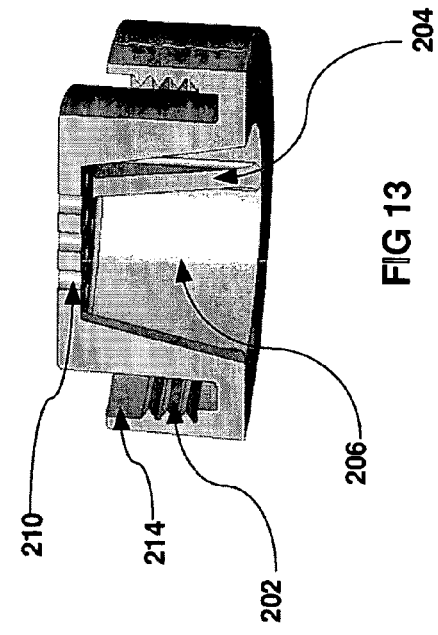
FIG 13
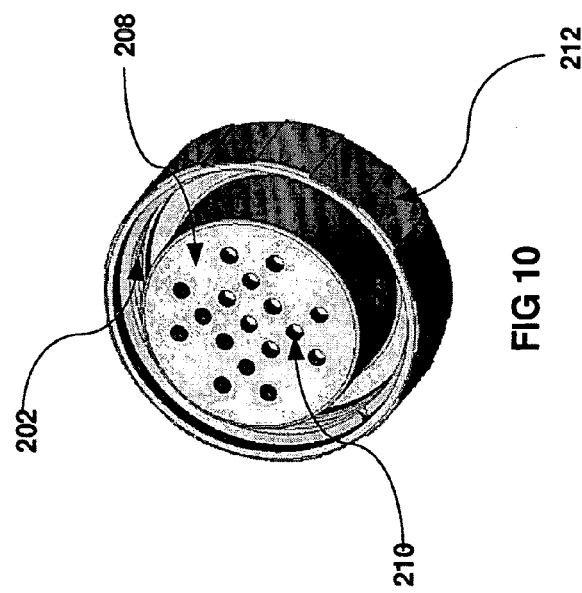
FIG 10
FIG 12

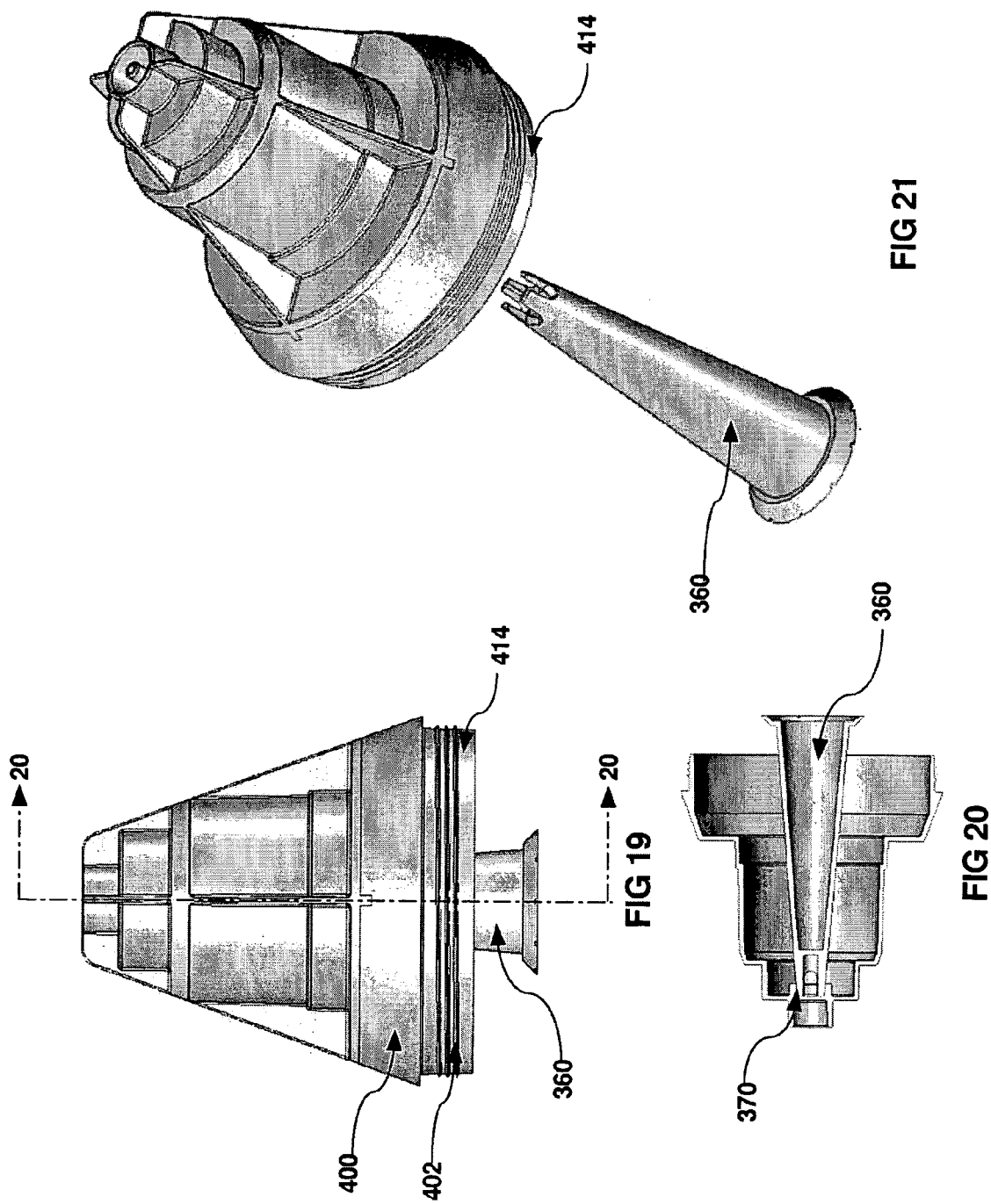

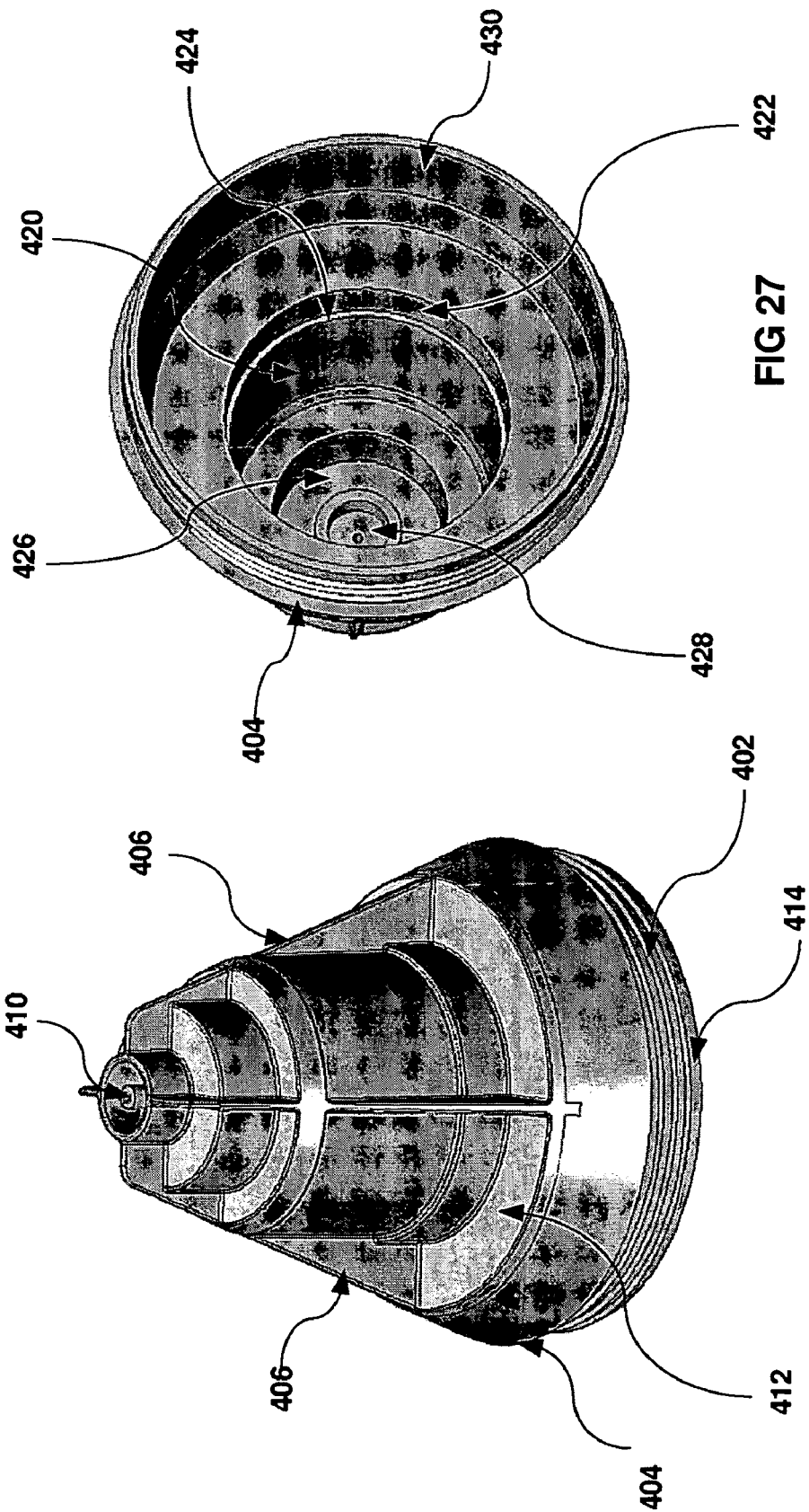

APPARATUS AND DELIVERY OF MEDICALLY PURE OXYGEN

CROSS-REFERENCED APPLICATIONS

This application relates to a U.S. patent application Ser. No. 10/718,131 entitled "METHOD AND APPARATUS FOR GENERATING OXYGEN", filed Nov. 20, 2003, which is hereby incorporated by reference for all purposes.

FIELD OF THE INVENTION

The present invention relates generally to the production of medically pure oxygen and, more particularly, to apparatus and methods of delivery of medically pure oxygen.

DESCRIPTION OF THE RELATED ART

Oxygen generators using chemical reactions have been known for some time, and the principles governing the chemical reaction driving the oxygen production are well documented. However, none of the conventional devices relating to chemical oxygen generators have resulted in medically pure oxygen becoming an easily accessible, inexpensive, over-the-counter consumer item, nor have they resulted in it becoming a standard-issue item for public and private emergency-response personnel and locations. In addition, conventional generators have not been widely adopted in commerce and industry. There are several possible factors contributing to this lack of interest, including one or a combination of unfavorable characteristics relating to reusability, safety, ease of use/operation, speed of use, heat management, cost, weight, aesthetic design, environmental impact, manufacturability, portability, medical efficacy, effectiveness, flow rate, oxygen yield, reaction stability, and oxygen purity. Some or all of these characteristics are not addressed, or are inadequately addressed, by conventional devices.

Conventional designs have not adequately addressed elimination of heat generated by the exothermic chemical reaction involved, without adversely affecting other factors such as cost and weight, for example. The heat generated by the chemical reaction can prevent the user from handling the generator itself with bare hands, either during or immediately following the reaction cycle. Efforts to address this shortcoming have reduced the portability and utility of the product.

Another issue is related to flow rate and to total oxygen yield. Conventional designs have not adequately addressed the associated consequences of more stringent performance requirements for flow rate and total oxygen yield, particularly in emergency and safety applications where higher flow rates are required, and, in some cases mandated by regulatory authorities. For example, the United States Food and Drug Administration (FDA) has long required a flow rate performance of at least 6 liters per minute over 15 minutes in order to obtain market clearance for over the counter purchase, resulting in a total oxygen yield requirement of 90 liters. Higher flow rates over a sustained period typically are accompanied by increased heat being generated by the chemical reaction. In addition, higher pressures being generated inside the reaction chamber generally accompany higher flow rate outputs or requirements.

The reaction chamber is a closed environment with typically at least one "exit point" for the oxygen generated. The higher pressure causes the aqueous reaction mixture to advance in the same direction and under the same pressure conditions as the oxygen being generated. A consequence is the dangerous possibility that some of the aqueous reaction mixture or some of the particles from the chemical reaction components will travel with the oxygen generated, into the user's lungs. Higher flow rates can also result in leakages and consequently safety concerns.

Therefore, a need exists for a method and/or apparatus for producing medically pure oxygen that addresses at least some of the problems associated with conventional methods and apparatus for producing medically pure oxygen.

SUMMARY OF THE INVENTION

The present invention provides an apparatus for delivering medically pure oxygen. An inner sleeve that contains an oxygen producing chemical reaction. The inner sleeve is contained within an outer housing. An insulating space or layer is interposed between at least a portion of the sleeve and housing. An oxygen transmission channel extends from and is in fluid communication with the contents of the inner sleeve.

In one aspect of the invention, a humidifier coupled to the oxygen transmission channel humidifies and filters the oxygen.

In another aspect of the invention, a cap holds together the sleeve and housing.

BRIEF DESCRIPTION OF THE DRAWINGS

For a more complete understanding of the present invention and the advantages thereof, reference is now made to the following descriptions taken in conjunction with the accompanying drawings, in which:

FIG. 1 is a front elevation view of the assembled generator dispenser according to present invention;

FIG. 2 is a sectional view along 2-2 of FIG. 1;

FIG. 4 is a front elevation view of the exploded or disassembled components of the base of the generator, comprising the reaction chamber exterior housing and the reaction chamber inner sleeve;

FIG. 5 is a perspective top view of the reaction chamber exterior housing and the reaction chamber inner sleeve;

FIG. 7 is a perspective view of the humidifier assembly;

FIG. 8 is a front elevation view of the exploded or disassembled components of the humidifier assembly, comprising the humidifier body and the humidifier base;

FIG. 9 is a sectional front view of the humidifier assembly along 9-9 in FIG. 7;

FIG. 10, FIG. 11 and FIG. 12 are perspective views of the humidifier base from different angles;

FIG. 13 is a view on section 13-13 of FIG. 11;

FIG. 19 is front elevation view of the cap of the generator dispenser;

FIG. 20 is a perspective view of the exploded or disassembled components of the cap and "outer stem" assembly;

FIG. 21 is a view on section 21-21 of FIG. 19;

FIG. 26 is a front elevation of the cap of the generator dispenser;

FIG. 27 is a perspective view of the bottom of the cap of the generator dispenser; and

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Figure 3:
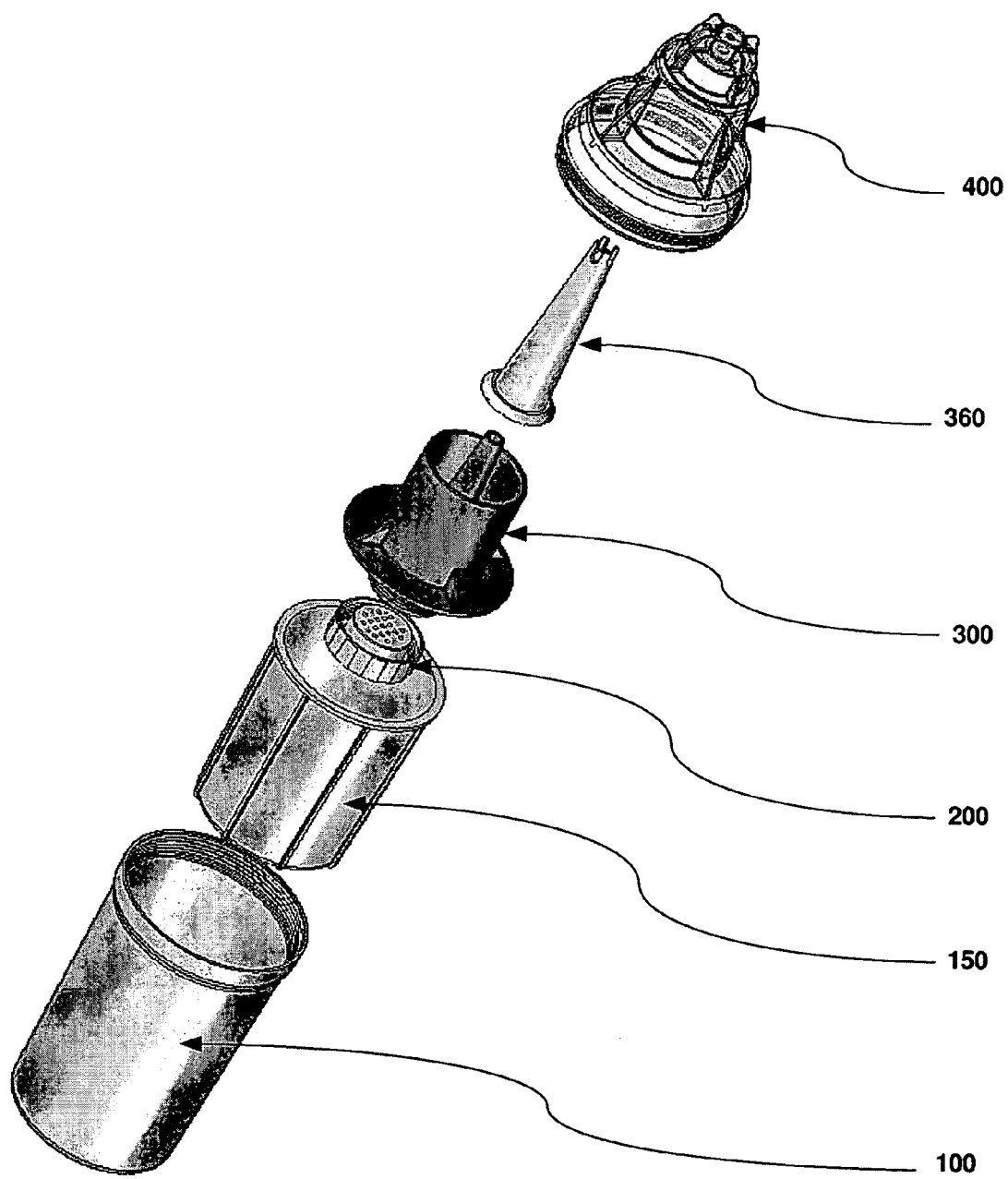
FIG. 3 is a perspective view of the exploded or disassembled components of the generator dispenser according to present invention.

Referring now to FIGS. 1, 2 and 3 of the drawings, a dispenser is shown comprising a reaction chamber exterior housing 100, a reaction chamber inner sleeve 150 which fits advantageously into the reaction chamber exterior housing 100, a humidifier base 200, a humidifier body 300, an outer stem 360 and a cap 400. These components fit together to form the assembled generator shown in FIG. 1. Also, the outer housing 100 and the reaction chamber are typically cylindrical. The reaction chamber inner sleeve 150 slides into the reaction chamber exterior housing 100 as illustrated by FIG. 4. The reaction chamber inner sleeve 150 can then adhere to the reaction chamber exterior housing at a lip boundary 152 in FIG. 2. Adherence of the reaction chamber to the can be accomplished through a variety of methods that include, but is not limited to, chemical bonding (such as epoxy) and thermal fusing (such as welding or melting together).

Additionally, the reaction chamber exterior housing 100 and the reaction chamber inner sleeve 150 can also be adhered to each other at various other locations. More particularly, the reaction chamber inner sleeve 150 at any point of contact with exterior housing 100, or the reaction chamber inner sleeve 150 and the reaction chamber exterior housing 100 can also be manufactured as one single component. By having the reaction chamber 150 and the exterior housing 100 manufactured as a single component, the need for an adhesive can be eliminated, and the integrity and strength of the reaction chamber 150 can be increased.

The reaction chamber 150 can also incorporate a "draft" into its design. A draft can facilitate or support a plastic injection molding process as a means of commercial production. For example, the draft can include a 1.5-degree angle between the vertical plane and the plane of the reaction chamber exterior housing as shown in FIG. 1. Other angles can also be employed. However, the reaction chamber inner sleeve 150 will typically employ the same draft angle as the reaction chamber exterior housing 100.

The sides of the reaction chamber inner sleeve 150 and the sides of the reaction chamber exterior housing 100 are separated from one another by a series of side ribs 160 illustrated in FIG. 5, attached to and placed equidistantly around the surface of the reaction chamber inner sleeve 150. The side ribs 160 can also be attached to and placed equidistantly around the surface of the reaction chamber exterior housing 100. However, if a plastic injection molding method of commercial production is used, then these side ribs 160 may cause "shadows" on the outer surface of the reaction chamber exterior housing 100, thereby causing adverse aesthetic effects. The bottom of the reaction chamber inner sleeve 150 and the bottom of the reaction chamber exterior housing 100 are separated from each other by a series of bottom ribs 120 illustrated in FIG. 5 and FIG. 6.

Figure 6:
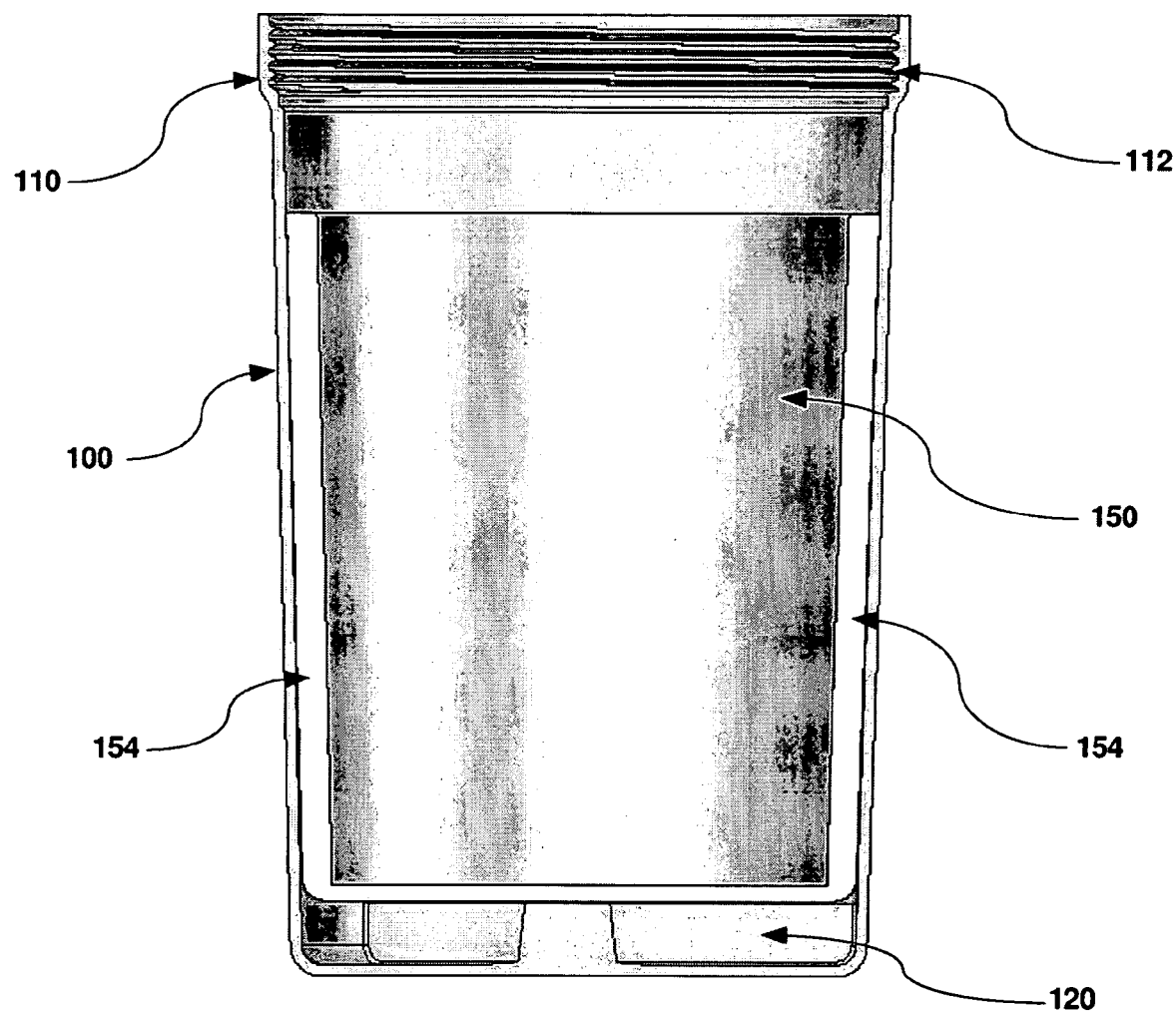
FIG. 6 is a sectional front view of the assembled reaction chamber exterior housing and the reaction chamber inner sleeve along 6-6 in FIG. 4.

These bottom ribs 120 can be designed to extend radially from the cylindrical axis of the outer housing (not shown) and are attached to the inside bottom of the reaction chamber exterior housing 100. FIG. 2 and FIG. 6 illustrate how the design creates a space 154 between the reaction chamber inner sleeve 150 and the reaction chamber exterior housing 100. This space creates a very effective "air insulator", serving to reduce, minimize or prevent the heat generated from the exothermic chemical reaction inside the reaction chamber inner sleeve 150 from reaching the outer surface of the reaction chamber exterior housing 100. The air insulation created by the space 154 illustrated in FIG. 2 and FIG. 6 is significantly effective in ensuring that the user of the oxygen generator can comfortably and safely handle the generator directly with bare hands, during, or after the chemical reaction cycle.

The side ribs 160 typically extend from the lip boundary 152 to a point just above the position of the bottom ribs 120. Essentially, the side ribs 160 provide a contact surface between the reaction chamber outer housing 100 and the reaction chamber inner sleeve 150 nearly parallel to the cylindrical axis to reaction chamber outer housing 100 and the reaction chamber inner sleeve 150. However, because the side ribs 160 are at and below the lip boundary 152, the ribs are hidden from view once assembled. A reason for having side ribs 160 and bottom ribs 120 is to provide spaces 154 or an insulation gap between the reaction chamber inner sleeve 150 and the reaction chamber outer housing 100 that will limit, reduce or otherwise minimize the transfer of heat between the inside of the reaction chamber inner sleeve 150 and the outer surface of the reaction chamber outer housing 100, thereby enhancing the ability of the user to comfortably operate the generator with bare hands, both during and upon completion of the chemical reaction cycle.

In addition to creating the spaces 154 illustrated in FIG. 2 and FIG. 6, which serve as an effective "air insulator," the ribs 120 and 160 illustrated in FIG. 5 also serve to significantly strengthen the reaction chamber by reinforcing both the reaction chamber exterior housing 100 and the reaction chamber inner sleeve 150. A much more effective resistance to pressure build-up (during the chemical reaction) can then be provided inside the reaction chamber than is currently provided. The use of ribs 120 and 160 would provide additional material to combat stress, strain, and, possibly, torsion that result from internal pressures by improving the tensile strength of the reaction chamber.

As an additional example, an additional material can be utilized instead of air. A material, such as a high strength epoxy can fill the gap that results from the separation between the reaction chamber 150 and outer housing 100. Thus, a single wall design with an inserted material would then have similar strength properties to one with an air gap, but also have the benefit of being completely solid.

Because the reaction to produce oxygen is an exothermic reaction, insulation from the reaction is desirable. The heat transfer from the chemical reaction to the surface of the reaction chamber exterior housing 100 can be further reduced or minimized by the material selection for the reaction chamber exterior housing 100 and the reaction chamber inner sleeve 150. Typically, each of the materials chosen has an R-factor above about 1.5. For example, the reaction chamber inner sleeve 150 can be made of Polycarbonate, and the reaction chamber exterior housing 100 can be made of Acrylonitrile Butadiene Styrene. Other plastics or materials such as Polypropylene or Polyethylene can also be used for either the reaction chamber exterior housing 100, or the reaction chamber inner sleeve 150.

The selection of Polycarbonate for the reaction chamber inner sleeve 150 is particularly advantageous for the physical properties of this material. Polycarbonate is a tough, dimensionally stable, transparent thermoplastic that is well suited to applications that demand high performance properties. From a commercial production point of view, Polycarbonate is widely available and accessible, and constitutes a versatile thermoplastic, which maintains its properties over a wide range of temperatures. Polycarbonate has the highest impact strength of any thermoplastic, and has outstanding dimensional and thermal stability, high tensile strength, good chemical resistance, exceptional machinability, low thermal conductivity and is non-toxic with low water absorption. The selection of Acrylonitrile Butadiene Styrene for the reaction chamber exterior housing 100, on the other hand, is advantageous for its lower (than Polycarbonate, for example) cost, while providing a rigid thermoplastic material that has high impact strength, high tensile strength and good machinability. However, there are also a variety of other polymers, plastics, and composite materials that can be used.

Furthermore, various wall thicknesses can be used for the reaction chamber exterior housing 100 and the reaction chamber inner sleeve 150. Examples for the wall thicknesses for the reaction chamber exterior housing 100 and the reaction chamber inner sleeve 150 include 0.093 inches and 0.125 inches respectively. However, the thickness of the walls can be varied according to either desire or need that is based on such considerations as the materials chosen and the thermal output of the reaction.

Referring to FIG. 7, FIG. 8 and FIG. 9, the humidifier base 200 is removable from the humidifier body 300. The humidifier base 200 incorporates inner thread (female) 202, which mates with the outer thread (male) 302 incorporated in the humidifier body 300 for easy and rapid unscrewing to remove and screwing back to replace. Three turns of inner thread 202 and outer thread 302 relative to each other can be used.

Once the humidifier base 200 and the humidifier body 300 are assembled, a plenum 250 is created. This plenum 250 is used to house the membrane stack 260, illustrated in FIG. 14 and FIG. 15. The removability of the humidifier base 200 allows for easy inspection of the membrane stack 260 housed in the plenum 250. In addition, the removability of the humidifier base 200 allows for easy and frequent replacement of any or all of the components of the membrane stack 260 housed in the plenum 250. Also, both the humidifier base 200 and the humidifier body 300 can be made of Polycarbonate or another polymer.

Referring to FIG. 10, FIG. 11, FIG. 12 and FIG. 13, the design of the humidifier base 200 includes an annular faceplate 208, which incorporates porosity, as to allow increased airflow to pass through to the plenum 250. The annular faceplate 208 also serves to rigidly support the membrane stack 260 above it.

The annular faceplate 208, however, can affect the airflow. Enhanced porosity can be achieved, for example, through circular apertures 210 in the annular faceplate 208. The shape of the apertures 210, however, can vary. The apertures 210 can be made sufficiently large in order to minimize any clogging of the membranes supported above the annular faceplate 208. Another way to prevent membrane clogging and to improve the performance of the membrane housing, in general, is to vary the contact angle with the air flow of the annular faceplate 208. An example is to vary the angle from 90° to something less than 90°, such as 65°.

The humidifier base 200 also incorporates several other features. A "grip detail" 212 is provided, which allows for enhanced grip (when removing/unscrewing or tightening) and easier user handling. A thread "lead-in" 214 is also provided to allow for faster and easier tightening. The thread lead-in 214 is a gap that extends above the inner thread (female) 202, so that when coupled with the outer thread (male) 302 there is not an immediate need for threading. In addition, the humidifier base 200 is reinforced with a series of angular ribs 204 to provide additional rigidity and strength to resist the upward pressure from the direction of the airflow and chemical reaction.

Figure 15:
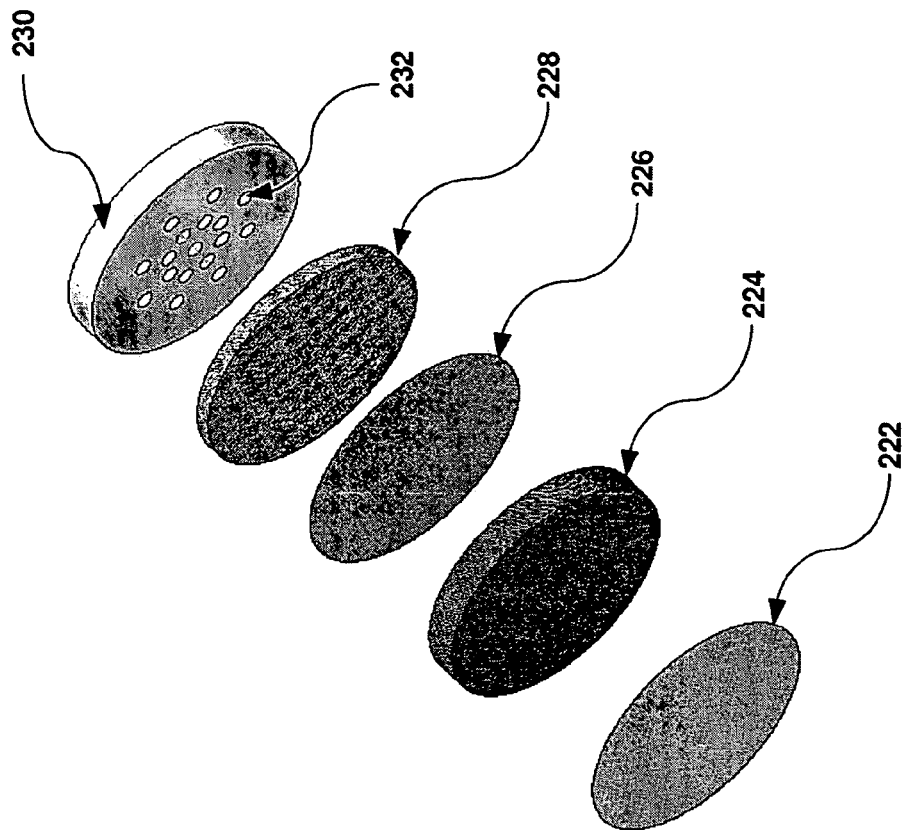
FIG. 15 is a perspective view of the exploded or disassembled components of the membrane stack.
Figure 14:
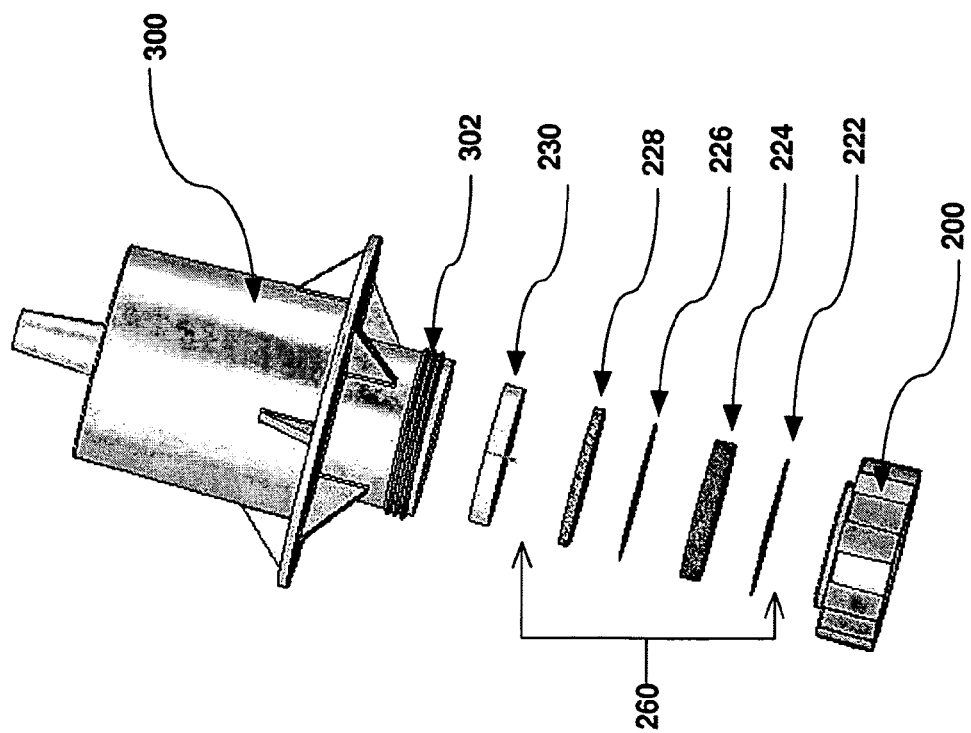
FIG. 14 is a perspective view of the exploded or disassembled components of the humidifier assembly and the membrane stack.

Utilizing a membrane stack 260, as illustrated in FIG. 14 and FIG. 15, improves filtration efficiency significantly. The different-components of the membrane stack 260, however, serve different functions. The first component of the membrane stack 260 consists of a pre-filter 222, the role of which is to remove or retain the majority of any chemical reaction particles or aqueous chemical solution and prevent same from entering or reaching the second tier of the membrane stack.

The pre-filter 222 is cost-effectively replaceable after every single chemical reaction or after every single use of the oxygen generator. The usage and lifespan of the other, more expensive, membranes in the stack can, thus, be increased due to the replacability of the pre-filter. Examples of pre-filters that can be used include glass fiber filter papers or binder-free glass microfiber filters. However, there are a variety of materials that can be utilized to form the pre-filters. The most practicable size for the pores of the pre-filter 222 is approximately 10 microns. The pre-filter 222 can also be preceded by a "foam-breaker", which could be a stainless steel mesh and can serve to filter coarse particles.

The functions of the second membrane 224 are to provide rigid support for the main phase separation membrane 226 and to provide additional filtration. During the chemical reaction, the airflow can exert significant pressure on the membranes. These pressures exerted on membranes used to separate the oxygen from any chemical reaction components/particles and any aqueous chemical solution can be very high, especially at the higher flow rates above 6 liters per minute. The second membrane 224 consists of a porous plastic and can be 0.250 inches thick. However, a variety of other materials and thicknesses can be employed.

The porous plastics used in the second membrane 250, however, contain an intricate network of open-celled, omni-directional pores. These pores, which can have average pore sizes as low as one micron, give porous plastics their unique combination of filtering capability and structural strength. Unlike the direct passages in woven synthetic materials and metal screens, the pores in porous plastic join to form many tortuous paths. Porous plastics have dual filtering capability. Not only do they act as surface filters by trapping particles larger than their average pore size, they also trap much smaller particulate matter deep in their complex channels, for a "depth filter" effect. Therefore, the efficiency of this tortuous path structure is such that porous plastics with an average pore size of 25 microns offer approximately the same filtration as five micron-rated filter media. The most practicable size for the pores of the second membrane 224 appears to be 10 microns, although a pore size rating of 10 microns through 30 microns can also be used.

The third membrane 226 provides final separation of the oxygen and any remaining aqueous solution or particle matter, resulting in medically pure oxygen being passed through to the humidifier 300. This third membrane 226 is designed to be Inherently hydrophobic for aqueous clarification and particulate capture. Also, the third membrane 226 should be compatible with strong acids and aggressive solutions and should be consistent with high flow rates for faster filtration Superior durability is also desirable.

The pore sizes for the third membrane 226 are usually smaller than the other membranes. Suitable pore sizes for the third membrane 226 can range anywhere from 0.1 microns to 10.0 microns, depending on flow rates desired. Examples of membranes that can be used include Polytetrafluoroethylene and Nylon membranes; however, a variety of other materials can also be used to form the membranes.

The fourth membrane 228 provides optional "downstream" support for the third membrane 226. It can consist of a porous plastic. Examples may include a 0.125 inch thick Polytetrafluoroethylene porous plastic, although other materials and thicknesses can be used.

FIG. 14 and FIG. 15 also show an annular disc 230. The annular disc 230 is designed to provide downstream rigid support for the membrane stack 260. The annular disc 230 provides for maximum oxygen flow into the humidifier body 300 through a series of apertures 232. Also, the annular disc 230 can be adhered to the annular face 252, shown in FIG. 18. Adhering the annular disc 230 to the annular face 252 ensures that users do not inadvertently forget to replace the annular disc 230 after removing the membrane stack 260 for inspection or replacement purposes.

Figure 17:
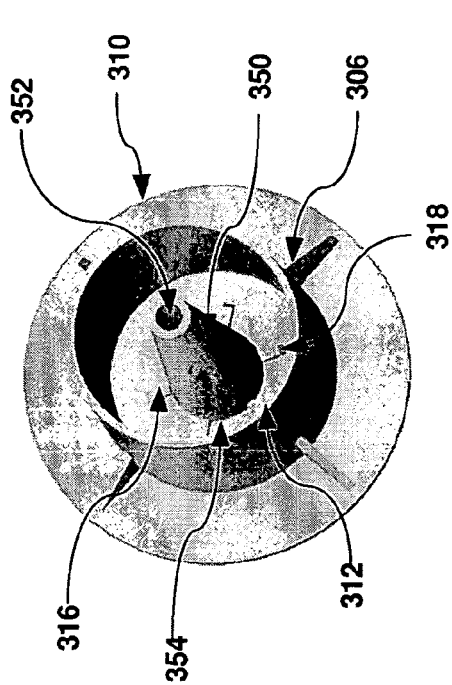
FIG. 17 and FIG. 18 are perspective views of the top and the bottom, respectively of the humidifier body.
Figure 18:
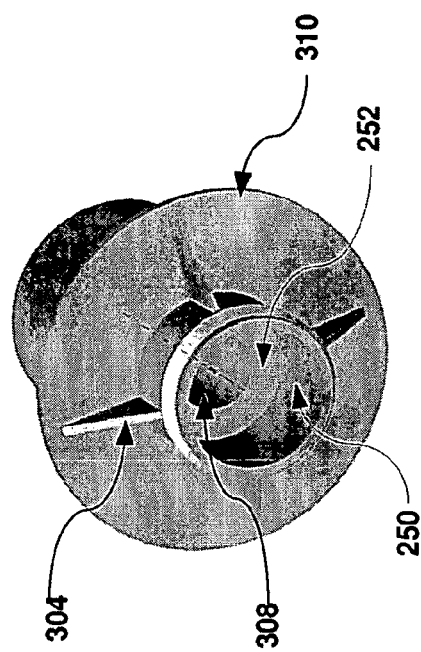

FIG. 18 illustrates an aperture 308 through which the purified oxygen flows into the inner stem 350, also shown in FIG. 17. The support provided by the annular disc 230 can ensure that the pressurized airflow, particularly at high flow rates, does not cause the membranes to bow into or be forced into aperture 308. The annular disc 230 can be made of Polycarbonate. The diameters of the membrane stack 260 and of the annular disc 232, both of which can vary, are selected in this invention to be 47 mm in diameter.

Figure 16:
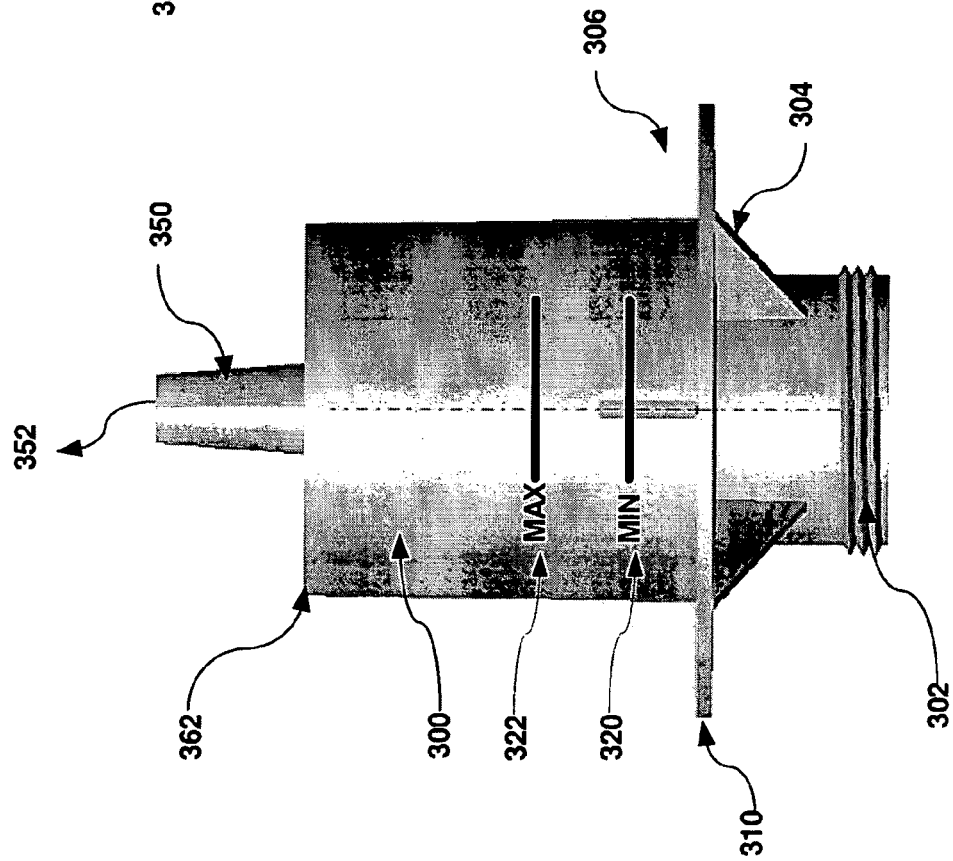
FIG. 16 is a front elevation view of the humidifier body.

Referring to FIG. 16, FIG. 17, and FIG. 18, the humidifier body 300 has an annular flange 310. The annular flange 310 isolates the reaction chamber formed by the reaction chamber inner sleeve 150. By isolating the reaction chamber, most of the chemical reaction can be sealed off as the annular flange 310 seats advantageously on the flat circular surface of the lip 156 at the top of the reaction chamber inner sleeve 150 shown in FIG. 5. The annular flange 310 is then reinforced with bottom ribs 304 and the top ribs 306, arranged axially to increase rigidity. The bottom ribs 304 and the top ribs 306 are staggered in terms of their placement opposite each other. For example, if the top ribs 306 are spatially arranged to be located at 0°, 90°, 180°, 270°, then the bottom ribs 304 are arranged to be at 45°, 135°, 225° and 315°, as illustrated in FIG. 16.

The staggered design further enhances the reinforcement effect of the ribs on the annular flange 310. By having ribs, such as the bottom ribs 304, staggered, there are no extended surfaces that can deform, bow, crack or move as a result of pressures. The ribbed design also effectively counteracts the upward pressure on the annular flange 310 by the positive pressure generated during the chemical reaction.

Figure 23:
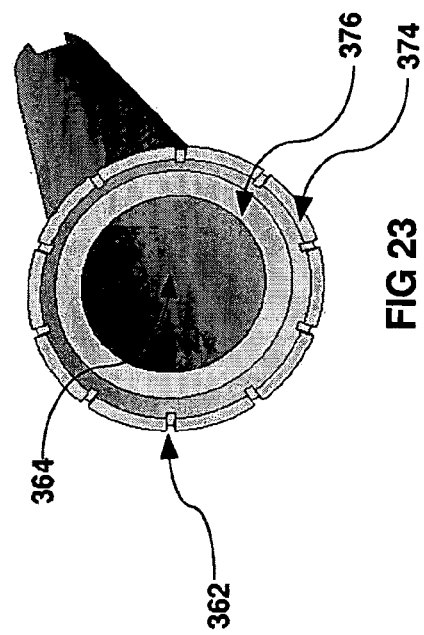

The humidifier body 300 also has predetermined minimum and maximum water levels 320 and 322, respectively. The minimum and maximum water levels 320 and 322, respectively, provide an easy, viewable guide, allowing the user to fill the humidifier body 300 with water to a pre-determined level prior to commencing the chemical reaction. The primary purpose of the water in the humidifier body 300 is to hydrate the oxygen produced. This hydration is achieved when the oxygen, flowing in a downward direction inside the outer stem 360 (FIG. 21) is diffused by the slats 362 (FIG. 23). After the diffusion, warm oxygen flows through the water added by the user in the humidifier body 300, causing water vapor and oxygen molecules to mix. The slats 362 act as "diffusion ports", creating improved hydration of the oxygen, while at the same time reducing system back pressure. The humidification process maintains a desirable level of oxygen saturation. The user ultimately breathes medically acceptable, hydrated oxygen, which translates into oxygen that is comfortable to breathe and not dry, as can be the case with many "traditional" oxygen devices.

Another component of the humidifier is the inner stem 350. The inner stem 350 is tapered such that the top aperture 352 is smaller in diameter than the diameter of bottom aperture 308, creating a nozzle. The taper effect allows for easy and convenient location of the inner stem 350 by the outer stem 360, shown in FIG. 19 and FIG. 20, upon closing of the generator by twisting on the cap 400, which is also shown in FIG. 19 and FIG. 20.

The humidifier body 300 also has a series of flat ribs 316 inside at its base. These flat ribs 316 are arranged radially from the base of the inner stem 350. These flat ribs 316 have ends 318 that are angled towards the base of the humidifier body 300. The flat ribs 316 serve to center the outer stem 360 upon closing of the generator. The angle of the lip 372 at the base of the outer stem 360 forces the outer stem to a center axial position by mating and fitting advantageously over the ends 318 of the flat ribs 316.

FIG. 19 and FIG. 20 illustrate the cap assembly, which includes the cap 400 and the outer stem 360. The outer stem 360 is attached to the cap 400 at a boundary 370. The outer stem 360 is attached to the cap 400 by adhering it to the sides of the cavity 428 at 370, as illustrated by FIG. 20. Alternatively, the cap assembly consisting of cap 400 and the outer stem 360 can be manufactured (using a process such as injection molding) as one piece. An advantage to the user of having the cap assembly as one piece is that it significantly facilitates rapid closure of the generator, while at the same time sealing off the humidifier and positioning the inner stem 350 and outer stem 360 correctly. Having a single cap 400 and outer stem 360 comprise a single piece is particularly helpful in medical emergency situations, where time is of the essence, and precious seconds can make a difference in saving a life.

Independently, the outer stem 360 has a bottom aperture 364 (shown in FIG. 23), and is tapered to match the taper angle of the inner stem 350. The bottom of the lip 374 of the outer stem 360 is flat and makes contact with the inside base of the humidifier body 300 upon closure of the generator. In addition, the surface 376 rests on the bottom ribs 316 once the generator is closed for additional stability and to prevent any "rattling" or "vibration" due to the oxygen flow during the reaction.

Figure 22:
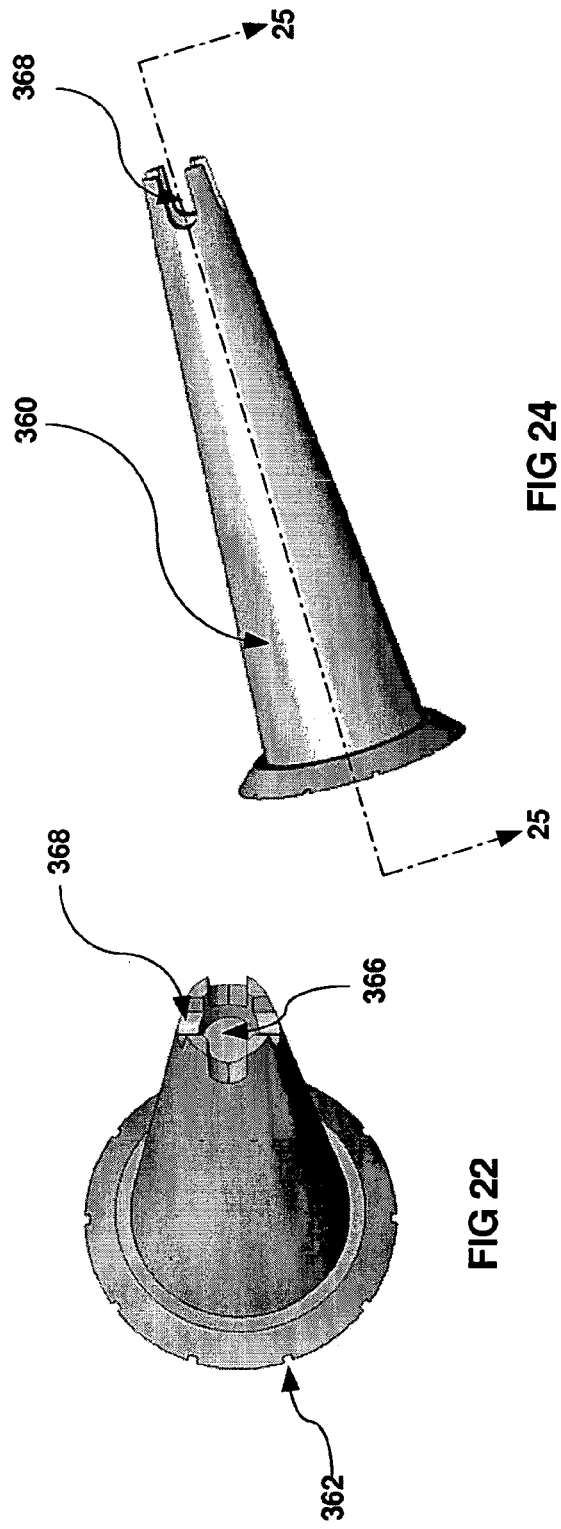

At the base of the outer stem 360 there are several slats 362, located substantially equidistant apart, as is shown in FIG. 22 and FIG. 23. These slats 362 allow for oxygen to pass through at high flow rates. However, apertures or holes can also be used instead of slats. The slats 362, though, cause the oxygen flowing through them to be diffused, providing superior oxygen hydration while at the same time facilitating quiet operation and reducing system back pressure. Toward the top of the outer stem 360 there is a flow barrier 366 that acts as a shut-off. The top of the outer stem 360 is designed to mate into the cavity 428, as shown in FIG. 27.

Referring to FIG. 26 and FIG. 27, the cap 400 has outer threads 402, which mate with the inner thread 112 of the reaction chamber exterior housing 100, creating an airtight seal. While any number of threads can be used, typically no more than three turns are preferred for faster closure. Inserting a gasket (not shown) or an O-ring (not shown) between the cap 400 and the reaction chamber 150 can further enhance air-tightness.

Additionally, the cap 400 has flange 404, which seats on the top of reaction chamber exterior housing 100 upon closure of the dispenser. The thread 402 is accommodated in such a manner as to allow the inside wall of the reaction chamber inner sleeve 150 to be substantially flush with the inside wall surface 430 of cap 400 by the use of a bell housing design 110, as illustrated in FIG. 4. The cap 400 further has exterior ribs 406, serving the functional purpose of facilitating user grip (for twisting/closing or untwisting/opening of the cap 400), as well as serving an aesthetic purpose.

The cap 400 also includes some other features. By designing the cap 400 with the insets 412, the user is able to more easily handle the cap 400, even if the user has smaller hands. The cap 400 has a recessed nipple outlet 410 through which the oxygen is expelled. The user can attach a tube (attached to a CPR mask) or cannula to the recessed nipple outlet 410.

Underneath the cap 400 there is a cavity 420, which completes the top half of the humidifier. The inside wall forming the cavity 420 and the inside wall of humidifier body 300 are preferably substantially flush upon closure. The substantial flushness is achieved through an offset 422, such that the top edge 362 of the humidifier body 300 slides into the offset 422 upon closure, coming to rest at 424 and sealing off the humidifier from the rest of the generator. The cap 400 can be made of clear Polycarbonate.

Figure 24:
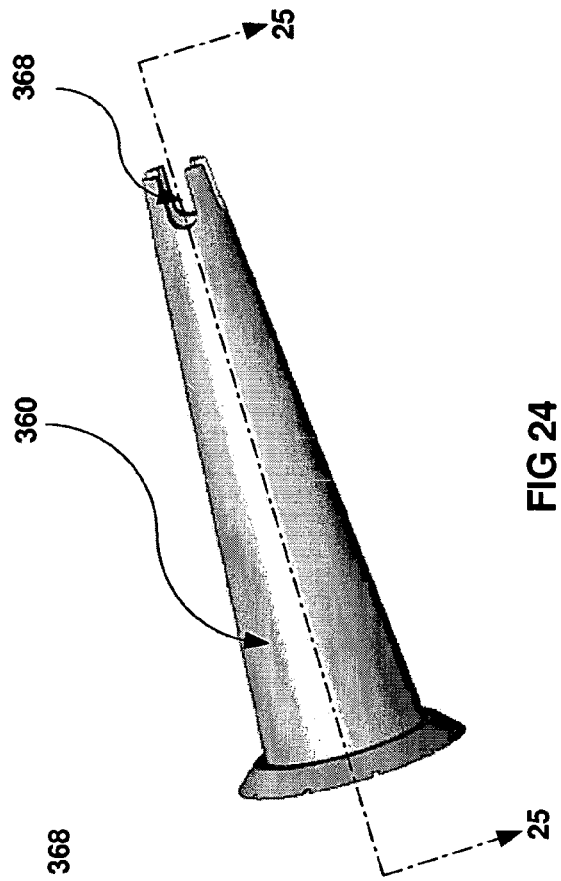
FIG. 22, FIG. 23 and FIG. 24 are perspective views of the "outer stem"
Figure 25:
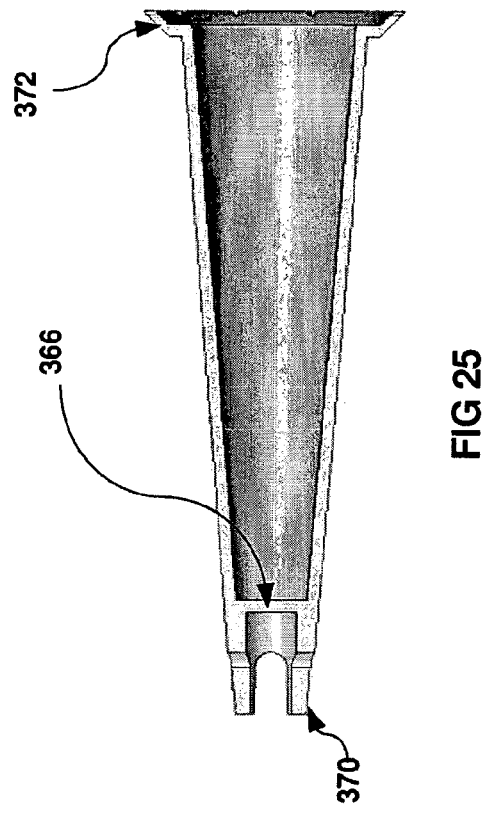
FIG. 25 is a view on section 25-25 of FIG. 24.

Once closed and the chemical reaction has commenced, the oxygen is expelled from the membrane stack 260, which flows through the annular disc 230, and enters the humidifier body 300 through inner stem 350 via the inlet provided by aperture 308. The oxygen exits the inner stem 350 at its top aperture 352, proceeding away from the reaction chamber 150. The oxygen is then forced into the opposite direction, toward the base of the humidifier body 300, by the flow barrier 366 located towards the top of the outer stem 360. The oxygen flows to the bottom of outer stem 360 and exits through the slats 362. At this point, the oxygen enters the water inside the humidifier body 300, bubbling through the water and being hydrated in the process. The hydrated oxygen can then proceed into plenum 426. The oxygen then enters the top of the outer stem 360 through the slats 368, as shown in FIG. 24, enters plenum 428, and then exits the generator through the recessed nipple outlet 410.

It is preferable to maintain control of the flow of oxygen. For this purpose, valve (not shown) can be used to regulate the flow of oxygen out of the cap 450. A variety of types of regulator valves can be utilized to control the flow of oxygen. Preferably, such a regulator valve would be coupled to the nipple 410 of the cap 450. Alternatively, a pressure regulator could be used in place of a regulator valve, to automatically adjust the pressure or flow rate of expelling oxygen to a desired set point or range.

Additionally or alternatively, oxygen flow rates can be controlled or regulated by varying the number or thickness of the layers of coating covering the particles of the oxygen releasing agent (usually in powder form) used in the chemical reaction. Flow rates can also be controlled through selection of the particle size of oxygen releasing agent. Clearly, flow rates can also be controlled through a combination of these three factors.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system for generating oxygen comprising:
an outer housing with at least one open end;
at least one inner sleeve sized to be contained within the outer housing, the inner sleeve having a reaction chamber for generating an oxygen gas flow;
a foam breaker positioned within the reaction chamber,
a membrane system in fluid communication with the reaction chamber, the membrane system adapted for filtering the oxygen gas flow, the membrane system comprising:
a pre-filter positioned in a pathway of the oxygen gas flow and adapted for separating a first portion of chemical reaction particles from the oxygen gas flow,
a first structural support supporting the pre-filter, the first structural support being positioned in the pathway of the oxygen gas flow and having a plurality of openings to allow for the passage of the oxygen gas flow,
a hydrophobic membrane for separating a second portion of chemical reaction particles from the oxygen gas flow, the hydrophobic membrane having a pore size in the range of substantially 0.1 to 10 microns,
a second structural support supporting the hydrophobic membrane, the second structural support being positioned in the pathway of the oxygen gas flow and having a plurality of openings to allow for the passage of the oxygen gas flow,
a hollow structure in fluid communication with the membrane system, the hollow structure having an inlet opening and at least one exhaust opening,
a humidifier system having a water containment basin wherein the at least one exhaust opening of the hollow structure is positioned inside the water containment basin,
a plenum in fluid communication with humidifier system and positioned within the pathway of the oxygen gas flow; and
an insulating layer interposed between and along at least a portion of the length of the outer housing and the inner sleeve.

2. The apparatus of claim 1, wherein the membrane system comprises a membrane stack positioned at a top portion of the reaction chamber, the membrane stack having an inlet opening and an exhaust opening.

3. The apparatus of claim 2, wherein the humidifier further comprises:
an inner hollow stem having an inlet opening and an exhaust opening, wherein the inlet opening is in fluid communication with the exhaust opening of the membrane stack, wherein the water containment basin is coupled to a portion of the exterior of the inner hollow stem, an outer stem enclosing a portion of the inner hollow steam to form a gas passage from the exhaust opening of the inner hollow stem to exhaust slits in the wall of the outer stem, wherein the exhaust slits open into the water containment basin.

4. The apparatus of claim 3, wherein the membrane stack further comprises a support filter to filter humidified oxygen.

5. The apparatus of claim 4, wherein the support filter further comprises a material selected from the group consisting of polytetraflouroethylene, nylon, nylon 6, high-density polyethylene, ultra-high molecular weight polyethelene, polypropylene, polyvinylidine fluoride and polyethersulfone.

6. The apparatus of claim 4, wherein the support filter is configured to be hydrophobic.

7. The apparatus of claim 1, further comprising one or more fin protruding normal to an outer surface of the inner sleeve interposed between the inner sleeve and the housing; and wherein a portion of the insulating layer further comprises an air gap formed by a separation of the inner sleeve and the housing by the one or more spacing members.

8. The apparatus of claim 1, wherein the plenum is formed in an interior space of an exterior cap, the exterior cap having an opening for coupling to the exterior housing and an opening for exhausting the oxygen gas flow.

9. The apparatus of claim 1, wherein the outer housing is at least configured to be composed of a material selected from a group consisting of polycarbonate and acrylonitrile butadiene styrene.

10. The apparatus of claim 1, wherein the inner sleeve is at least configured to be composed of a material selected from a group consisting of polycarbonate and acrylonitrile butadiene styrene.

11. The apparatus of claim 1, wherein the pre-filter further comprises a material having one or more portions with an average pore size of approximately 10 microns and is made from a glass fiber filter paper or a binder-free glass microfilter.

12. The apparatus of claim 1, wherein the first structural support further comprises a material having one or more portions with an average pore size ranging from approximately 1 micron to 30 microns.

13. The apparatus of claim 1, wherein the first structural support further comprises a material having a network of open-celled, omni-directional pores which form tortuous flow paths.

14. The apparatus of claim 1, wherein at least a portion of the hydrophobic membrane comprises a material selected from the group consisting of polytetraflouroethylene and nylon.

15. The apparatus of claim 1, wherein the second structural support further comprises a porous filter made from Polytetraflouroethylene.

16. The apparatus of claim 15, wherein the porous plastic filter has a thickness of substantially 0.125 of an inch.

* * * * *